US010486594B2

(12) United States Patent
Abbas et al.

(10) Patent No.: US 10,486,594 B2
(45) Date of Patent: Nov. 26, 2019

(54) SYSTEMS AND METHODS FOR DETERMINING VEHICLE WIRELESS CAMERA LATENCY

(71) Applicant: Ford Global Technologies, LLC, Dearborn, MI (US)

(72) Inventors: Samer Abbas, Dearborn Heights, MI (US); John P. Joyce, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 15/709,352

(22) Filed: Sep. 19, 2017

(65) Prior Publication Data
US 2019/0084476 A1 Mar. 21, 2019

(51) Int. Cl.
*B60R 1/00* (2006.01)
*B60R 11/04* (2006.01)

(52) U.S. Cl.
CPC ............. *B60R 1/00* (2013.01); *B60R 11/04* (2013.01); *B60R 2300/406* (2013.01); *B60R 2300/802* (2013.01); *B60R 2300/806* (2013.01); *B60R 2300/8066* (2013.01); *B60R 2300/8093* (2013.01)

(58) Field of Classification Search
CPC ..... B60R 1/00; B60R 11/04; B60R 2300/406; B60R 2300/802; B60R 2300/806; B60R 2300/8066; B60R 2300/8093
See application file for complete search history.

(56) References Cited

U.S. PATENT DOCUMENTS

| 6,995,687 | B2 | 2/2006 | Lang et al. | |
|---|---|---|---|---|
| 7,142,098 | B2 | 11/2006 | Lang et al. | |
| 8,838,322 | B1 | 9/2014 | Zhu et al. | |
| 9,503,694 | B2 | 11/2016 | Hooton | |
| 2006/0064208 | A1* | 3/2006 | Lang | B60R 1/00 701/1 |

(Continued)

FOREIGN PATENT DOCUMENTS

| GB | 2542494 A | 3/2017 | |
|---|---|---|---|
| WO | WO2017108508 | * 6/2017 | ............... B60R 1/02 |

OTHER PUBLICATIONS

"GMC announces new hauling package, trailering camera system." https://www.hardworkingtrucks.com/gmc-announces-new-hauling-package-trailering-camera-system/ May 23, 2016 (Year: 2016).*

(Continued)

*Primary Examiner* — Farzana Hossain
(74) *Attorney, Agent, or Firm* — Frank Lollo; Eversheds Sutherland (US) LLP

(57) ABSTRACT

Systems, devices, and methods are disclosed for determining a vehicle wireless camera latency. An example vehicle includes a display and a brake light, and a processor. The processor is configured to receive data transmitted by a wireless camera configured to capturing images of the brake light. The processor is further configured to determine a first point in time at which the wireless camera captures the brake light illuminated. The processor is also configured to determine a second point in time at which the display shows the brake light illuminated. And the processor is still further configured to determine a wireless camera latency based on the first and second points in time.

17 Claims, 4 Drawing Sheets

(56) References Cited

U.S. PATENT DOCUMENTS

| | | | |
|---|---|---|---|
| 2011/0234801 A1* | 9/2011 | Yamada | B60R 1/00 348/148 |
| 2013/0158740 A1* | 6/2013 | Kahler | G01C 21/34 701/1 |
| 2014/0340510 A1* | 11/2014 | Ihlenburg | H04N 7/18 348/118 |
| 2015/0172518 A1* | 6/2015 | Lucas | H04N 5/2251 348/148 |
| 2016/0052453 A1 | 2/2016 | Nalepka et al. | |
| 2018/0154830 A1* | 6/2018 | Tsuji | B60R 1/00 |

OTHER PUBLICATIONS

"Trailering Camera System available for Silverado." https://media.chevrolet.com/media/ca/en/chevrolet/news.detail.html/content/Pages/news/us/en/2016/mar/0316-trailering.html Mar. 16, 2016 (Year: 2016).*

* cited by examiner

SYSTEMS AND METHODS FOR DETERMINING VEHICLE WIRELESS CAMERA LATENCY

TECHNICAL FIELD

The present disclosure generally relates to systems, devices, and methods for determining a vehicle wireless camera latency and, more specifically, enabling the use of off the shelf (or aftermarket) wireless cameras in connection with vehicles.

BACKGROUND

Modern vehicles are increasingly being sold with backup or reverse facing cameras to allow a driver to view what is behind the vehicle. This is especially true for vehicles that are used to pull a trailer, where the driver's view may be blocked.

Some rear facing cameras may be wired, such that communication between the camera and the vehicle is done through a wired connection. Alternatively, some cameras may be wireless, and may transmit images and video to the vehicle via one or more wireless communication protocols.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for determining and providing a vehicle user with a wireless camera latency, which may reflect a delay between when an action occurs within the field of view of the camera and that action is shown on a vehicle display. An example disclosed vehicle includes a display and a brake light. The vehicle also includes a processor configured to receive data transmitted by a wireless camera configured to capture images of the brake light. The processor is also configured to determine a first point in time at which the wireless camera captures the brake light illuminated. The processor is further configured to determine a second point in time at which the display shows the brake light illuminated. And the processor is still further configured to determine a wireless camera latency based on the first and second points in time.

An example disclosed method for determining vehicle wireless camera latency includes determining, by a processor, a first point in time at which a wireless camera captures a brake light illuminated. The method also includes determining, by the processor, a second point in time at which a vehicle display coupled to the wireless camera shows the brake light illuminated. And the method further includes determining, by the processor, a wireless camera latency based on the first and second points in time.

An example disclosed non-transitory, computer-readable medium has instructions stored thereon that, when executed by a processor, perform a set of acts. The set of acts includes determining a first point in time at which a wireless camera captures a brake light illuminated. The set of acts also includes determining a second point in time at which a vehicle display coupled to the wireless camera shows the brake light illuminated. And the set of acts further includes determining a wireless camera latency based on the first and second points in time.

Another example may include means for determining a first point in time at which a wireless camera captures a brake light illuminated. The example may also include means for determining a second point in time at which a vehicle display coupled to the wireless camera shows the brake light illuminated. And the example may further include means for determining a wireless camera latency based on the first and second points in time.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
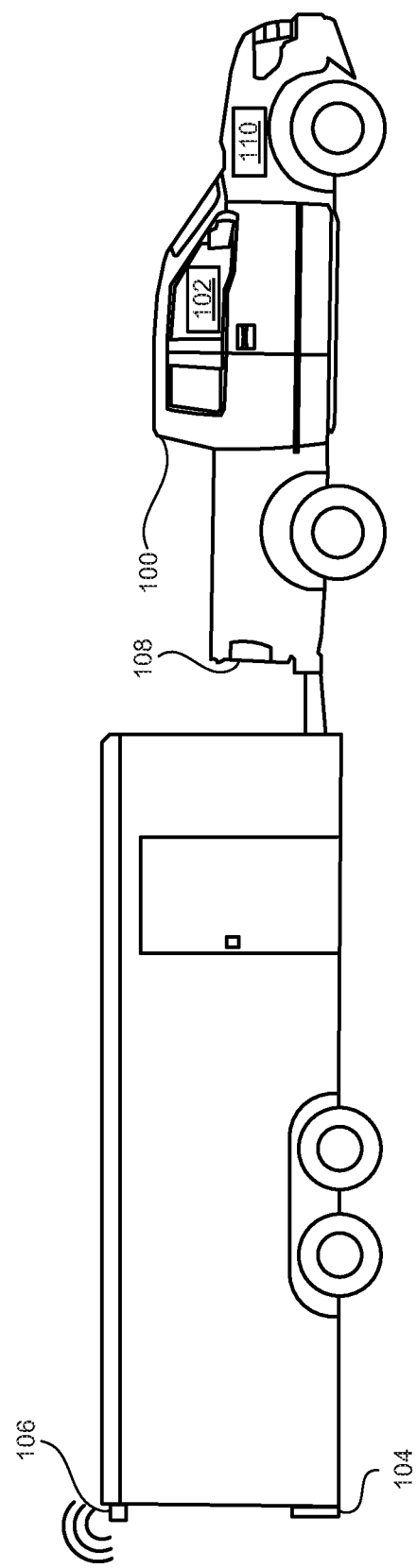
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, example devices, systems, and methods disclosed herein relate to determining a wireless camera latency and alerting a driver, to allow the driver to determine whether a delay in images shown on a vehicle display is short enough.

Many vehicle manufacturers, especially those that produce vehicles for hauling a trailer, include the ability to use a rear-view or rear facing camera. These cameras may provide the driver of the vehicle with a view of the rear of the vehicle and/or trailer, to enable the driver to have a better view of the surroundings. This can be especially important while the vehicle and/or trailer are in reverse and when the driver is backing up.

Cameras have traditionally been wired to one or more other systems of the vehicle, allowing a central vehicle processor and/or display to show the images received over the wired connection. In order to provide more flexibility in use, example embodiments of the present disclosure may include a wireless camera, configured to communicate with one or more systems, devices, or components of the vehicle via Wi-Fi or another wireless communication method. Further, the systems, devices, and methods of the present disclosure may allow a user to include an aftermarket or off the shelf wireless camera that need not be pre-initialized or have any predetermined characteristics that are known by the vehicle manufacturer. This allows for greater flexibility of use.

The use of a wireless camera, however, may come with significant problems that must be overcome. For instance, the introduction of a wireless camera may include a transmitting delay or wireless camera latency. The latency may cause a delay in showing an action on screen after the action is captured by the camera. This can be confusing to a driver and can result in reduced safety and delays in taking action, such as a delay in applying the brakes when an object is detected behind the vehicle.

The latency must be kept below a threshold level to ensure that the driver can properly use the camera. For instance, the threshold delay may be on the order of a few hundred milliseconds at the high end. Anything higher may cause safety concerns for the driver backing up, because the display is too far delayed from reality.

As such, example embodiments of the present disclosure may provide methods, systems, and devices that enable a driver to test the latency of a wireless camera as it is used in a vehicle setting, to allow the user to determine whether the latency is too high and whether the camera can be used safely. Further, embodiments disclosed herein may enable a driver to perform the test him or herself, which allows the driver to quickly and easily determine whether a particular camera should be used, even one that is not included with the vehicle and/or was purchased separately.

To accomplish these tasks and assist in solving the problems described above, an example vehicle may include a display, a brake light, and a processor communicatively coupled to a wireless camera aimed at the brake light. In one example, the camera latency may be determined by carrying out the following steps: (1) pair the vehicle to the wireless camera, (2) instruct the user to aim the wireless camera at the vehicle brake light, and (3) instruct the user to press the brake pedal.

Once the brake pedal is pressed, two points in time may be determined, by the vehicle processor for example, and the difference may be used to determine the camera latency. First, the processor may determine a first point in time at which the wireless camera captures the brake light being illuminated. This may be, for instance, the particular point in time at which the brake light reaches full illumination (due to the delay and time required to fully power on the brake light). This can be determined based on various signals and known delays of the vehicle. The first point in time may also be determined relative to the point in time at which the user presses the brake pedal.

The second point in time may be determined by the processor as the point in time at which the vehicle display shows the brake light illuminated. This may be done by performing image processing on the display, to detect when the brake light is shown at full illumination. In effect, the first point in time may be the point in time at which a particular action is captured by the camera, and the second point in time may be the point in time at which the particular action is shown on the display. The particular action in the example described above happens to be when the brake light reaches full illumination. However, other actions can be used as well, such as when the brake light first turns on, strobes on and off, or some other event.

The difference between the first and second points in time may be the wireless camera latency, reflecting the delay between when the action is captured by the camera (the brake light reaching full illumination) and when the action is shown on the display.

These two points in time may be determined based on other reference points, making use of known or pre-calculated system, device, and processing delays, in combination with signals received from one or more devices or systems of the vehicle and/or wireless camera. For instance, the vehicle processor may receive signals from the brake light indicating when the brake light has received power. Further, the internal vehicle delay may be predetermined, as well as various processing delays. The signals and delays may be added and subtracted in various combinations to arrive at the particular point in time at which one or more actions occur.

FIG. 1 illustrates an example vehicle 100, coupled to a trailer. Vehicle 100. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components, described in further detail with respect to FIG. 2.

Vehicle 100 may include a display 102, a brake light 108, and a processor 110. The trailer may include a brake light 104, and may have wireless camera 106 coupled to a rear side of the trailer. In some examples, brake light 104 and brake light 108 may be electrically coupled, such that both lights are turned on and off at the same time.

Display 102 may be configured to receive instructions and data from processor 110, and to show images and video captured by wireless camera 106.

Brake lights 104 and 108 may be coupled to a brake pedal of vehicle 100, such that when the brake pedal is pressed the brake lights receive power and turn on. Further, brake lights 104 and 108 may include an illumination delay corresponding to a length of time between when the brake light first receives power and when the brake light reaches full intensity. This may be a warming up period of the light. In some examples, brake lights 104 and 108 may be LED lights, in which case the illumination delay may be negligible or very small. Alternatively, brake lights 104 and 108 may include incandescent bulbs or another type of light bulb, which may have a longer warming up period.

Wireless camera 106 may be any type of camera configured to communicate with vehicle 100 via a wireless communication protocol. For instance, wireless camera 106 may stream or transmit data to vehicle 100 via Wi-Fi, RF, or another communication protocol. During operation, wireless camera 106 may capture images at a first point in time, and after an internal delay, may transmit the images to vehicle 100. The internal camera processing delay may change from camera to camera, and thus may be an important factor in the overall wireless camera latency. Transmission of the image and/or video data to vehicle 100 may include a further transmission delay. This transmission delay may also add to the overall wireless camera latency.

Processor 110 may be configured to receive the image and/or video data from wireless camera 106, process the data, and cause it to be shown on display 102. After receiving the data, the processor may include a processing delay, which may be factored into the overall wireless camera latency.

Processor 110 may also be configured to determine the various points in time and delays of the various systems and devices of the present disclosure, in order to ultimately determine the wireless camera latency. For instance, processor 110 may determine (1) when the brake pedal is pressed, (2) when the brake light receives power, (3) when the brake light reaches full illumination, (4) when the data from the camera is received by the processor, and (5) when the data is shown on the display 102. Other determinations are possible as well.

Figure 2:
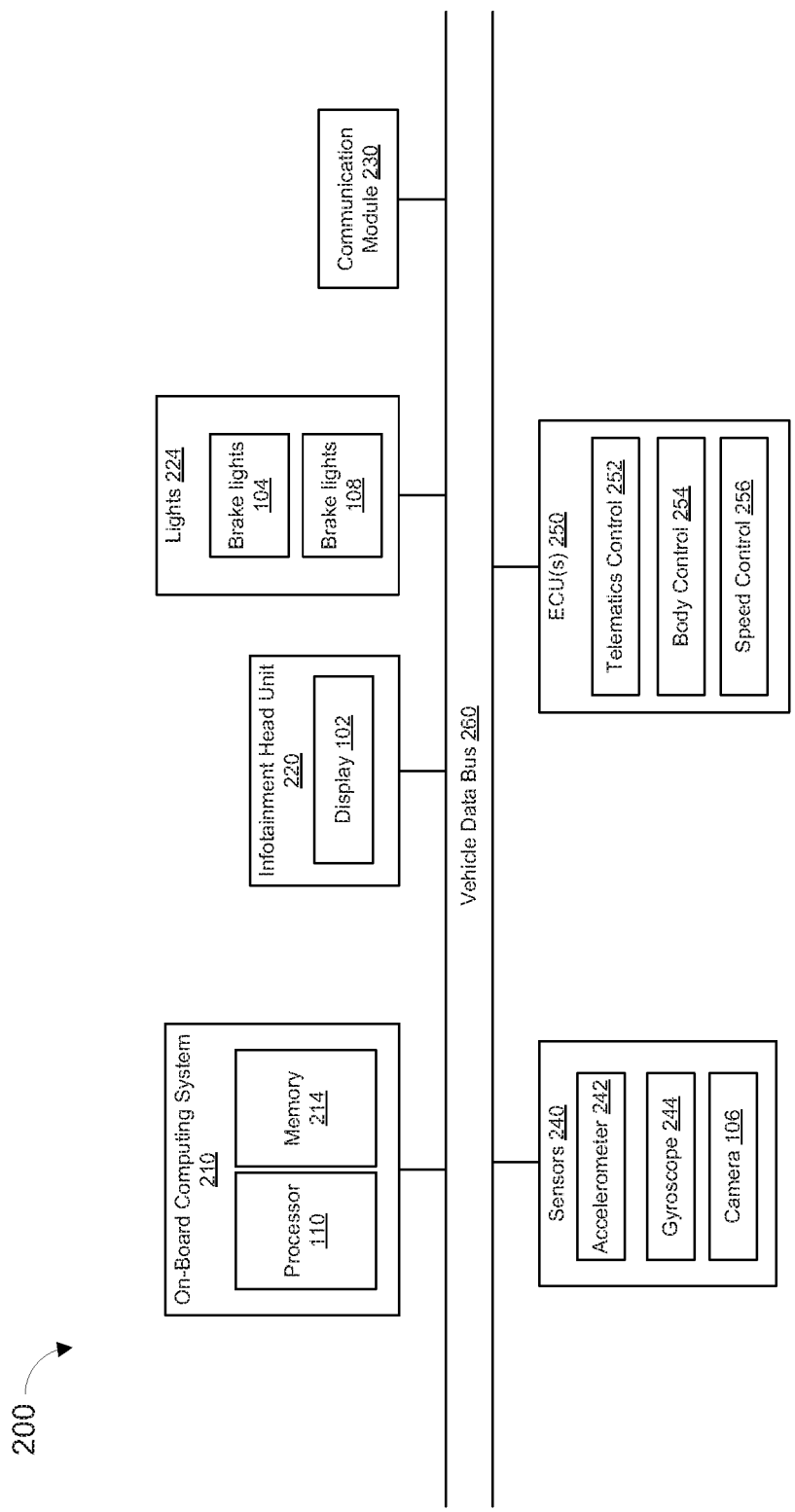
FIG. 2 illustrates an example block diagram of some electronic components of the vehicle of FIG. 1.

FIG. 2 illustrates an example block diagram 200 showing electronic components of vehicle 100, according to some embodiments. In the illustrated example, the electronic components 200 include an on-board computing system 210, infotainment head unit 220, lights 224, communication module 230, sensors 240, electronic control unit(s) 250, and vehicle data bus 260.

The on-board computing system 210 may include a microcontroller unit, controller or processor 110 and memory 212. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 102. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display 102 of vehicle 100.

Lights 224 may include vehicle brake lights 104 and 108. Brake lights 104 and 108 may include sensors or circuitry configured to send a signal to processor 110 when they have been powered on, powered off, reach full illumination, or when another event occurs.

Communication module 230 may include one or more antennas configured to receive data from one or more wireless sources. Communication module 230 may be communicatively coupled to wireless camera 106, and may receive images and/or video via one or more wireless protocols.

Sensors 240 may be arranged in and around the vehicle 100 in any suitable fashion, and may be configured to determine one or more characteristics of vehicle 100. For example, accelerometer 242 may measure an acceleration of vehicle 100, gyroscope 244 may measure a pitch, roll, yaw, or other change in vehicle 100, and camera 106 may be configured to capture and transmit images to be displayed by vehicle 100. Other sensors may be included as well, such as noise detection sensors, air flow sensors, and more.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may control the speed of vehicle 100, via control of the brakes, drive train, and/or one or more other systems or devices. Other ECUs are possible as well.

Vehicle data bus 260 may include one or more data buses that communicatively couple the on-board computing system 210, infotainment head unit 220, lights 224, communication module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3:
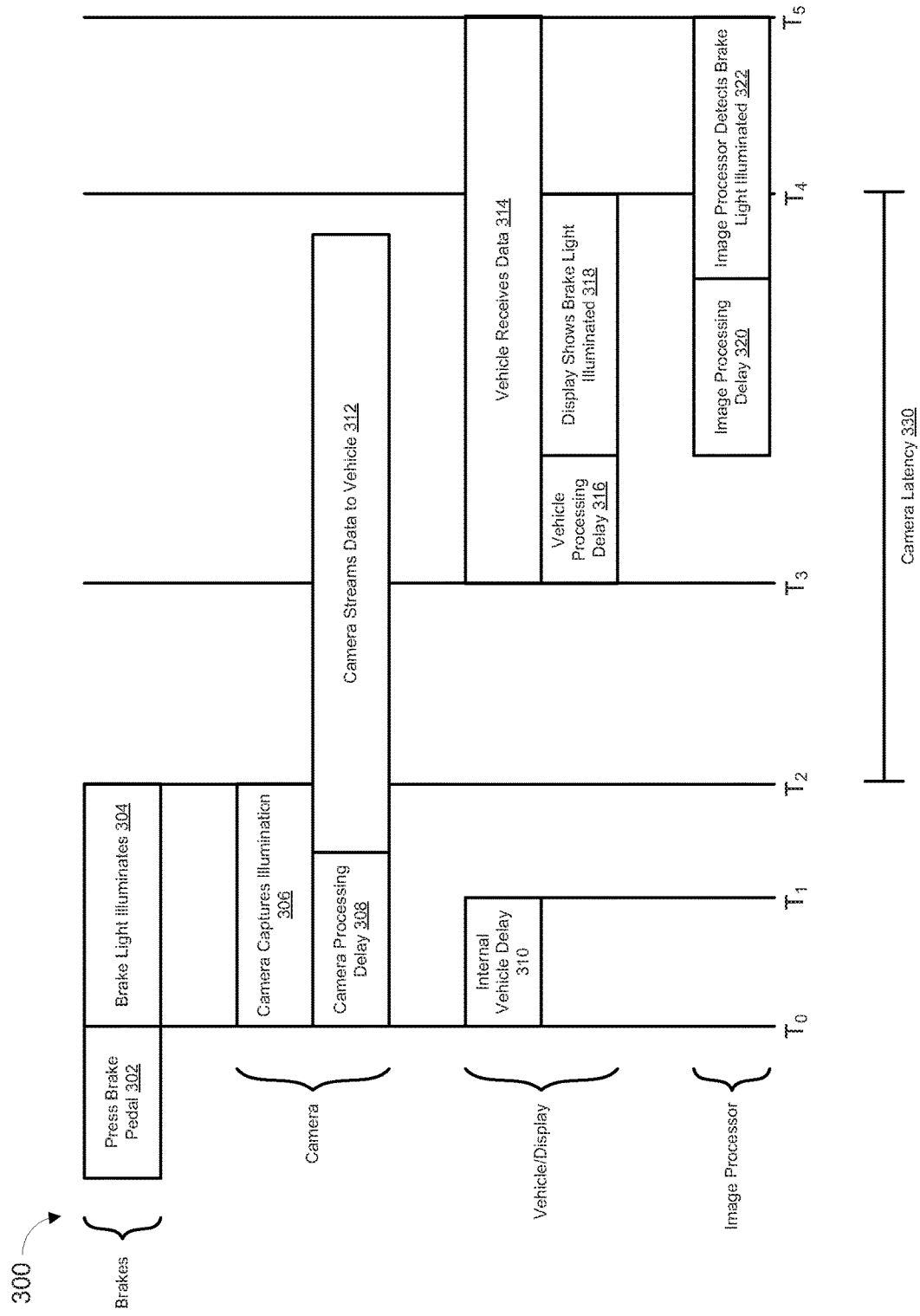
FIG. 3 illustrates an example timeline that can be used to determine a wireless camera latency, according to embodiments of the present disclosure.

FIG. 3 illustrates a time line 300, showing events that may occur during the course of carrying out one or more methods described herein. The methods may be performed by the systems and devices of this disclosure, and may be used to determine a wireless camera latency by having a user press a brake pedal, capturing the resulting brake light illumination, and displaying the brake light illumination on the vehicle display.

At block 302, the user of the vehicle may press the brake pedal which may cause the brake pedal hardwire to go "high." This in turn may cause the brake light to be powered on. Time $T_0$ reflects the point in time at which the brake light first receives power to turn it on.

At block 304, time line 300 includes the brake light illuminating. At the beginning of block 304, the brake light may first receive power, and may start becoming illuminated. The light may gradually become more illuminated over time, and may reach full illumination at time $T_2$.

Block 306 may include a time for which the wireless camera (such as camera 106) captures the illumination of the brake light. This time period may be commensurate with the time period over which the light receives power and becomes fully illuminated (i.e., block 304).

Block 308 may include a camera processing delay, corresponding to the length of time after an action is captured by the camera to the time at which it is transmitted for display by the vehicle. This delay is an internal camera delay, that may be different for each camera and may differ based on the manufacturer or other characteristic of the camera.

Block 310 includes an internal vehicle delay corresponding to the length of time for which a message indicating the brake light has received power takes to reach the processors. After the brake pedal is pressed and the brake light receives power, a message may be sent indicating that the brake light has received power. This message may include an intrinsic delay, due to the systems and mechanisms over which it is sent. For instance, this delay may be on the order of 50 ms, reflecting a delay based on the vehicle controller area network (CAN) bus.

Time $T_1$ reflects a point in time at which the vehicle processor received the signal that the brake light has received power. The processor may use time $T_1$ in order to calculate one or more of Time(s) $T_0$ and $T_2$. In order to do this, the processor may subtract the known internal vehicle delay 310 from time $T_1$, and add a known period of time needed for the brake light to fully illuminate. The internal vehicle delay may be determined during manufacturing, and may be stored in a memory of the vehicle. Also, the time required for the brake light to become fully illuminated may be known, depending on one or more characteristics of the light used. The vehicle may have stored in memory a look up table, or one or more values corresponding to various lights. And the particular light used in the brake light may affect the delay of block 304. In some examples, the type of light used may be requested as input from a user, and the user may input the type of light at some time prior to running a test to determine the camera latency.

Block 312 may begin immediately following the camera processing delay 308. Block 312 may include the camera streaming captured images and/or video to the vehicle over a wireless communication path. The wireless camera may continue transmitting data to the vehicle over a longer period of time than that shown in FIG. 3.

Time $T_3$ reflects the point in time at which the vehicle first receives data from the wireless camera corresponding to the brake light becoming illuminated. Block 314 includes the vehicle receiving data from the wireless camera, which may continue for a period of time longer or shorter than that shown in FIG. 3.

Beginning at time $T_3$, upon receipt of the data from the camera, block 316 may include the vehicle having a vehicle processing delay. The processing delay may correspond to a length of time between the first moment at which the brake light image is received, and the moment in time at which the brake light image is shown on the display.

After the vehicle processing delay, block 318 may include displaying the brake light illuminated on the display. This block may show the same information as was captured by the camera in block 306. As such, at the end of block 318, the display will show the fully illuminated brake light (i.e., the state of the brake light at time $T_2$). This is the point in time $T_4$ illustrated in FIG. 3.

Also, when the display begins to show the brake light becoming illuminated at block 318, an image processor may begin to analyze the display to determine whether the brake light is fully illuminated or not. The image processor may include an image processing delay at block 320. Block 322 may include the image processor detecting that the display shows the brake light fully illuminated at time $T_5$. As such, the processor may be able to directly determine that the display shows the brake light fully illuminated at time $T_5$.

However, while the processor may detect that the brake light is fully illuminated at time $T_5$, the true point in time at which the brake light was shown fully illuminated on the display is at time $T_4$. As such, the wireless camera latency may be the difference in time between time $T_4$ and time $T_2$. But these points in time may not be easily determined directly.

In order to determine point in time $T_4$, the processor may subtract a known image processing delay from time $T_5$. The processing delay may be determined during manufacturing, or at some other time and stored in a vehicle memory.

And the processor may determine time $T_2$ indirectly based on measured point in time $T_1$. This may be done by subtracting the known internal vehicle delay of block 310, and adding the known brake light illumination delay of block 304.

And based on the determined $T_2$ and $T_4$, the processor may determine the camera latency. This latency may then be shown on the vehicle display.

Figure 4:
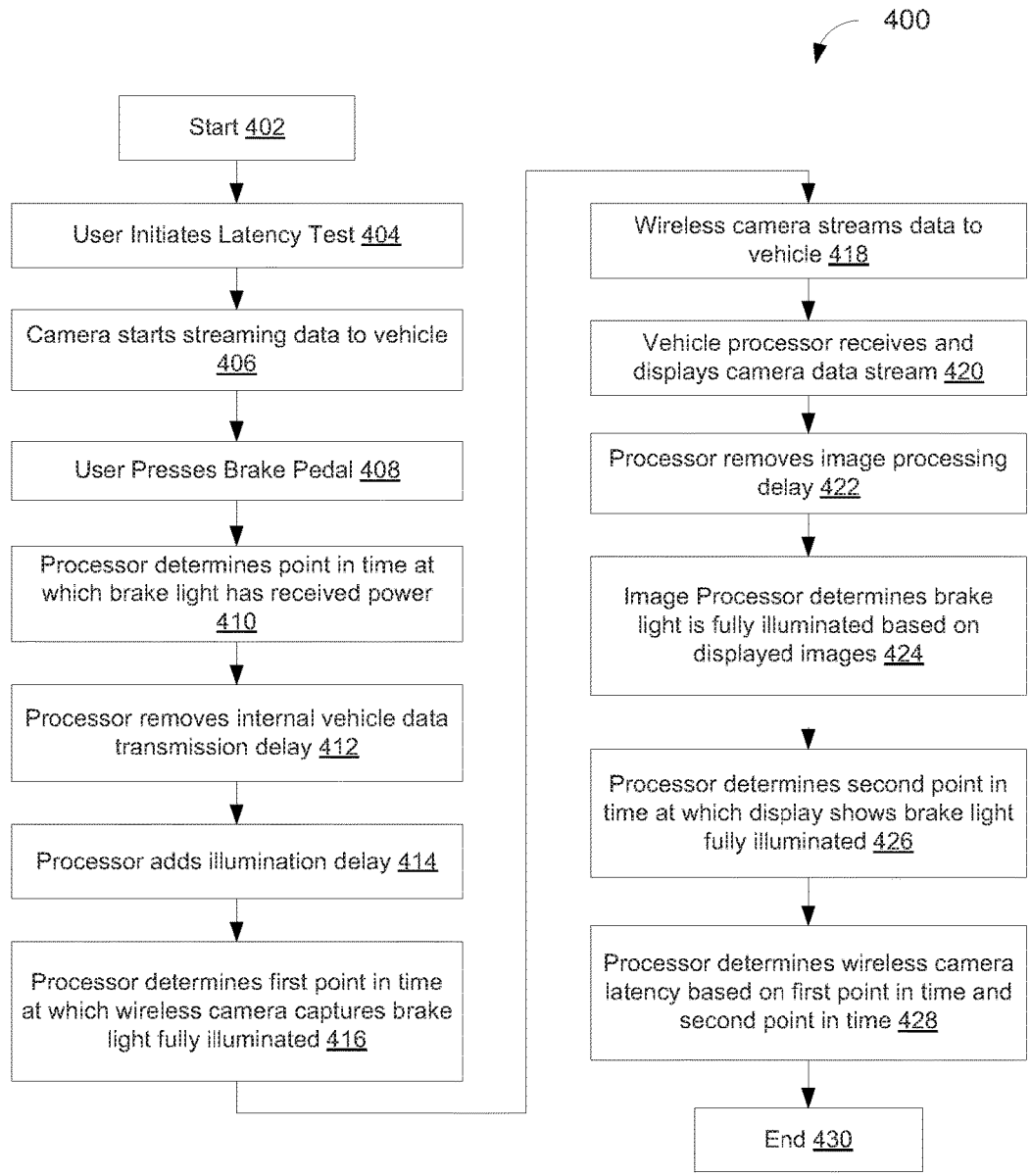
FIG. 4 illustrates a flowchart of an example method according to embodiments of the present disclosure.

FIG. 4 illustrates an example method 400 according to embodiments of the present disclosure. Method 400 may enable a vehicle to determine the latency of a wireless camera. The flowchart of FIG. 4 is representative of machine readable instructions that are stored in memory and may include one or more programs which, when executed by a processor may cause vehicle 100 and/or one or more systems or devices described herein to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, a user may initiate a latency test. Alternatively, block 404 may include an automatic latency test initiation based on a new wireless camera being connected or paired with the vehicle. The latency test may include prompting a user to aim the wireless camera at a brake light of the vehicle, and then instructing the user to press the brake pedal.

At block 406, method 400 may include the camera beginning to stream or transmit data to the vehicle to be shown on the vehicle display. At block 408, method 400 may include the user pressing the brake pedal. This may start a timer in the vehicle, after which various point in time can be determined.

Method 400 may then involve determining a point in time at which the brake light has received power. This may be determined based on a vehicle processor receiving a signal indicating that the brake light has been turned on. Method 400 may then include the processor subtracting an internal vehicle transmission delay from the determined point in time. This subtraction, in effect, can result in the true point in time at which the brake light was turned on.

Block 414 of method 400 may then include adding an illumination delay. The illumination delay, as described above, corresponds to the amount of time required for the brake light to reach full illumination from the point at which it is turned on or first receives power.

Then, based on the determined point in time, the determined internal vehicle data transmission delay, and the illumination delay, method 400 may include determining a first point in time at which the wireless camera captures the brake light illuminated at block 416.

At block 418, method 400 may include the wireless camera streaming data to the vehicle, including images and/or video of the brake light turning on and becoming fully illuminated.

At block 420, method 400 may include the processor receiving and displaying the data stream from the wireless camera. Then at block 422, method 400 may include the processor removing an image processing delay. The image processing delay may be an amount of time after an image is shown on the vehicle display until the time at which the image processor can recognize the image. For instance, the image processor may be configured to determine when the image shown comprises the brake light fully illuminated. In that case the image processing delay would be the amount of time between when the fully illuminated brake light is shown on the display, and when the image processor detects that the fully illuminated brake light is shown on the display. The image processing delay may be determined during manufacturing of the vehicle and/or vehicle components. As such, the image processing delay may be a hard-coded constant.

At block 424, method 400 may include the image processor determining that the brake light is fully illuminated. And at block 426, method 400 may include determining a second point in time at which the display shows the brake light fully illuminated.

Then, based on the first and second determined points in time, block 428 of method 400 may include the processor determining the wireless camera latency. This may include determining a difference between the first and second points in time.

Further, method 400 may include showing the determined camera latency on the display, and/or indicating whether the latency is too high. The vehicle may have a stored threshold value that can be compared to the determined latency, and the method may include displaying an indication of PASS/FAIL or a similar indication to a user via the display.

Method 400 may then end at block 430.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a display and brake light; and
a processor configured to:
receive data transmitted by a wireless camera configured to capturing images of the brake light;
determine a first point in time at which the wireless camera captures the brake light illuminated;
determine a second point in time at which the display shows the brake light illuminated;
determine a wireless camera latency based on the first and second points in time;
determine a third point in time at which the brake light has received power, based on a signal received from the brake light;
determine an internal vehicle data transmission delay; and
determine an illumination delay corresponding to a first length of time between when the brake light receives power and when the brake light becomes fully illuminated,
wherein the first point in time is determined based on the third point in time, the internal vehicle data transmission delay, and the illumination delay.

2. The vehicle of claim 1, wherein the internal vehicle data transmission delay comprises a second length of time between when (i) the brake light receives power, and (ii) a message indicating that the brake light has received power is received by the processor.

3. The vehicle of claim 1, wherein the first point in time is determined by adding the illumination delay to the third point in time, and subtracting the internal vehicle data transmission delay.

4. The vehicle of claim 1, further comprising:
an image processor configured to analyze images on the display, wherein the processor is further configured to:
determine a fourth point in time at which the image processor determines that the brake light is fully illuminated;
determine an image processor delay; and
determine the second point in time based on the fourth point in time and the image processor delay.

5. The vehicle of claim 4, wherein the image processor delay comprises a third length of time between when (i) the brake light is fully illuminated and (ii) the image processor determines that the brake light is fully illuminated.

6. The vehicle of claim 1, further comprising a trailer, wherein the wireless camera is mounted on the trailer and the brake light is positioned on a rear side of trailer.

7. The vehicle of claim 1, wherein the processor is further configured to provide an indication of the wireless camera latency on the display.

8. A method for determining vehicle wireless camera latency comprising: determining, by a processor, a first point in time at which a wireless camera captures a brake light illuminated; determining, by the processor, a second point in time at which a vehicle display coupled to the wireless camera shows the brake light illuminated, wherein determining the second point in time comprises determining, by the processor, a third point in time at which an image processor determines that the brake light is fully illuminated, based on analysis of images shown on the vehicle display, determining an image processor delay, and determining, by the processor, the second point in time based on the third point in time and the image processor delay; and determining, by the processor, a wireless camera latency based on the first and second points in time.

9. The method of claim 8, wherein determining the first point in time comprises: determining, by the processor, a fourth point in time at which the brake light has received power, based on a signal received from the brake light; determining an internal vehicle data transmission delay; determining an illumination delay corresponding to a first length of time between when the brake light receives power and when the brake light becomes fully illuminated; and determining the first point in time based on the fourth point in time, the internal vehicle data transmission delay, and the illumination delay.

10. The method of claim 9, wherein the internal vehicle data transmission delay comprises a second length of time between when (i) the brake light receives power, and (ii) a message indicating that the brake light has received power is received by the processor.

11. The method of claim 9, wherein the first point in time is determined by adding the illumination delay to the fourth point in time, and subtracting the internal vehicle data transmission delay.

12. The method of claim 8, wherein the image processor delay comprises a third length of time between when (i) the brake light is fully illuminated and (ii) the image processor determines that the brake light is fully illuminated.

13. The method of claim 8, wherein the wireless camera is mounted on a vehicle trailer, and the brake light is positioned on rear side of the vehicle trailer.

14. The method of claim 8, further comprising providing an indication of the wireless camera latency on the vehicle display.

15. A non-transitory, computer-readable medium, having instructions stored thereon that, when executed by a processor, cause performance of a set of acts comprising: determining a first point in time at which a wireless camera captures a brake light illuminated, wherein determining the first point in time comprises determining a second point in time at which the brake light has received power, based on a signal received from the brake light, determining an internal vehicle data transmission delay, determining an illumination delay corresponding to a length of time between when the brake light receives power and when the brake light becomes fully illuminated, and determining the first point in time based on the second point in time, the internal vehicle data transmission delay, and the illumination delay; determining a third point in time at which a vehicle display coupled to the wireless camera shows the brake light illuminated; and determining a wireless camera latency based on the first and third points in time.

16. The non-transitory, computer-readable medium of claim 15, further comprising: determining a fourth point in time at which an image processor determines that the brake light is fully illuminated, based on analysis of images shown on the vehicle display; determining an image processor delay; and determining the third point in time based on the fourth point in time and the image processor delay.

17. The non-transitory, computer-readable medium of claim 15, the set of acts further comprising providing an indication of the wireless camera latency on the vehicle display.

* * * * *